Figure 1:
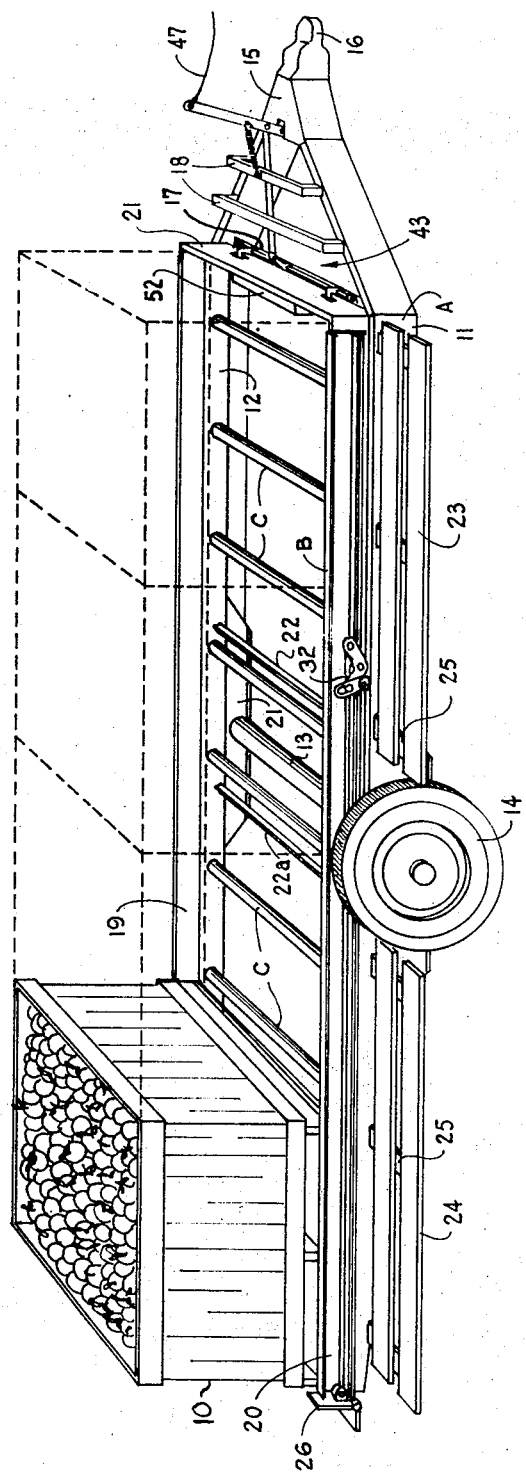

United States Patent [19]
Holmes et al.

[11] 3,780,894
[45] Dec. 25, 1973

[54] TRAILER
[76] Inventors: James C. Holmes; Fred M. Holmes, both of Johnston, S.C.
[22] Filed: Sept. 8, 1969
[21] Appl. No.: 856,222

[52] U.S. Cl.................. 214/505, 214/84, 298/23 A
[51] Int. Cl........................... B60p 1/24, B60p 1/52
[58] Field of Search..................... 214/505, 506, 84; 298/5, 17, 23 A

[56] References Cited
UNITED STATES PATENTS

| | | | |
|---|---|---|---|
| 1,459,385 | 6/1923 | Wills et al. | 298/17 |
| 1,481,763 | 1/1924 | Trimmer | 298/17 |
| 2,225,522 | 12/1940 | Keith | 298/5 |
| 2,408,862 | 10/1946 | Lisota | 214/506 |
| 3,432,053 | 3/1969 | Vereschagin | 214/505 |
| 3,455,474 | 7/1969 | Truncali | 214/505 |
| 3,335,887 | 8/1967 | Snook | 214/84 X |

Primary Examiner—Albert J. Makay
Attorney—Bailey and Dority

[57] ABSTRACT

A trailer for transporting bulk boxes loaded with fruit from the field and the like, to a remote location. The trailer is provided with a flat bed which is pivotally carried on an axle so that such can be pivoted to an unloading position. The flat bed is weighted so that when such is loaded with bulk boxes it will pivot to the unloaded position, and when the bulk boxes are unloaded therefrom the flat bed will automatically return to the horizontal position. A retaining member is carried adjacent the rear end of the flat bed for preventing the bulk boxes from rolling off the bed. Means are provided for automatically lowering the retaining member out of the path of the bulk boxes as the flat bed pivots to the unloaded position.

2 Claims, 4 Drawing Figures

INVENTORS.
JAMES C. HOLMES
FRED M. HOLMES
BY
Bailey & Douty
ATTORNEYS

TRAILER

This invention relates to a trailer, and more particularly to a trailer for transporting bulk boxes loaded with fruit and the like from fields.

Heretofore, when harvesting fruit, such as peaches and the like, normally a picker would place his fruit in a bushel size field box so that he could be paid according to the amount he picked from the trees. These field boxes were loaded onto a flat bed trailer and subsequently hauled to packing houses for processing. One of the problems with such an operation is that it required numerous field boxes, plus it required both loading and unloading the field boxes onto flat bed trailers. This required a considerable amount of time and effort.

In order to overcome such problems trailers have been developed for hauling bulk boxes. Normally, however, in order to unload the bulk boxes a hydraulic unit was provided to pivot a flat bed portion of the trailer so that the bulk boxes could roll off. These trailers were expensive and also susceptible to the hydraulic unit breaking down, thus interfering with the unloading operation of the bulk boxes.

Accordingly, it is an important object of the present invention to provide a trailer for transporting bulk boxes of fruit and the like, which can be readily unloaded therefrom without damaging the fruit carried therein.

Another important object of the present invention is to provide a trailer for transporting bulk boxes of fruit and the like which has a retaining member for holding the boxes on the trailer that automatically moves out of the path of the boxes when the trailer is pivoted to an unloading position.

Still another important object of the present invention is to provide a trailer for transporting bulk boxes and the like, which pivots to an unloading position responsive to disengaging a latch means to unload the bulk boxes and returns to a horizontal position after said boxes have been unloaded.

A further important object of the present invention is to provide a relatively simple and inexpensive trailer for transporting bulk boxes of fruit and the like.

The construction designed to carry out the invention will be hereinafter described, together with other features thereof.

Figure 2:
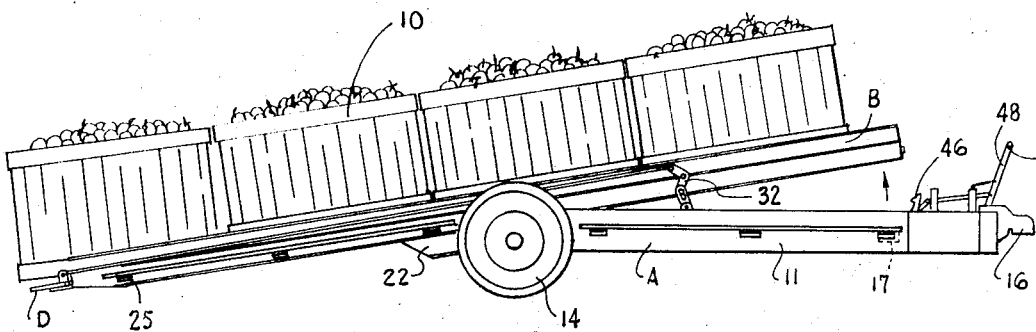
Figure 4:
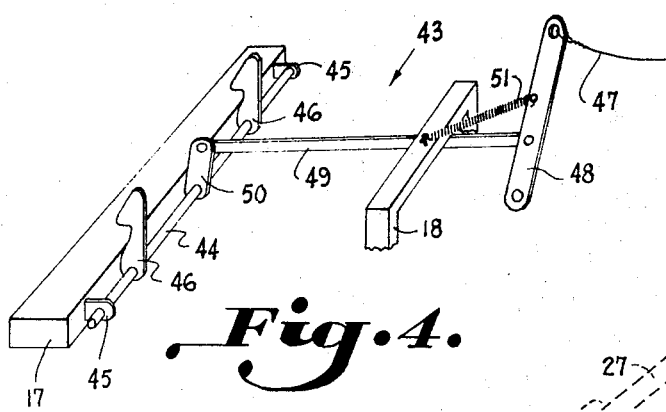
Figure 3:
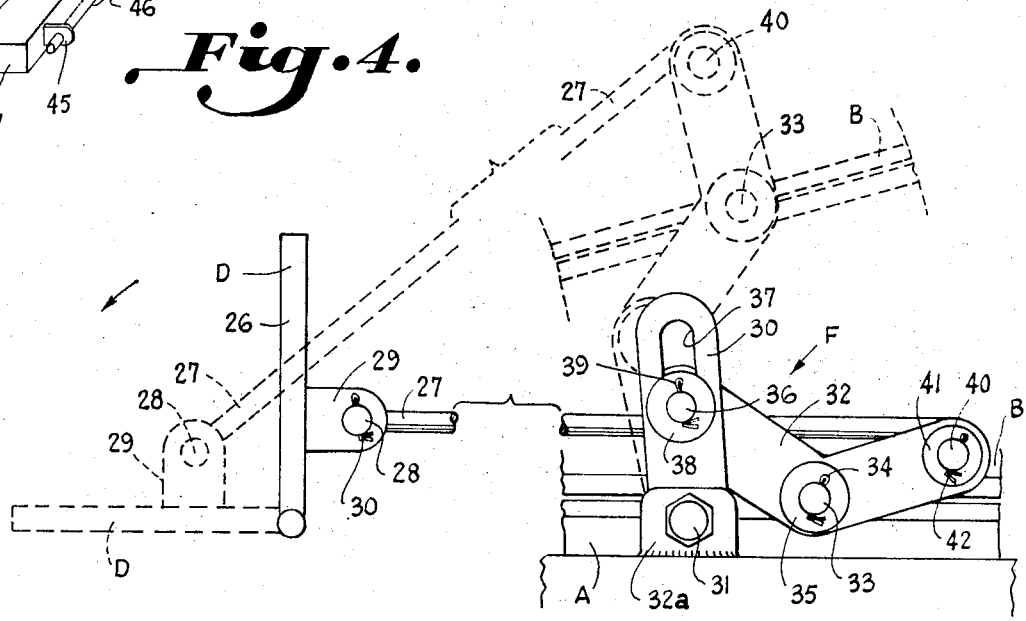

The invention will be more readily understood from a reading of the following specification and by reference to the accompanying drawings forming a part thereof, wherein an example of the invention is shown and wherein:

FIG. 1 is a perspective view of a trailer constructed in accordance with the present invention in a transporting position, FIG. 2 is a side elevational view illustrating a trailer constructed in accordance with the present invention in an unloading position, FIG. 3 is an enlarged side elevational view illustrating a retaining member which prevents bulk boxes from rolling off the flat bed and means for lowering such in alternate positions, and FIG. 4 is an enlarged fragmentary perspective view illustrating the latching mechanism for the trailer.

The drawings illustrate a trailer for transporting bulk boxes loaded with fruit from fields and the like to remote locations. The trailer includes a pair of wheel assemblies rotatably carried on an axle. A supporting horizontal frame A is carried adjacent one end by the axle. A hitch is carried adjacent the other end of the frame A for attachment to a vehicle capable of pulling the trailer. An elongated flat bed B is pivotally carried on the axle. The elongated flat bed includes opposed elongated frame members. A plurality of spaced rollers C are disposed between the opposed elongated frame members for supporting the bulk boxes. A retaining member D is carried adjacent the rear end of the flat bed B in a vertical position for preventing the bulk boxes from rolling off the flat bed when the flat bed is in a horizontal transporting position. Latch means are provided for engaging the flat bed for maintaining the flat bed B in a horizontal position when transporting the bulk boxes. Means E is provided for releasing the latch means in order to allow the flat bed B to pivot on the axle to an unloading position where the rear end of the flat bed rests on the ground allowing the bulk boxes to roll off the flat bed. Linkage means F is coupled between the flat bed B and the supporting frame A for automatically lowering the retaining means D out of the path of the bulk boxes as the flat bed pivots to an unloading position. The axle is positioned forward of the center of the flat bed B so that when the bulk boxes are evenly positioned on the flat bed such pivots to the unloading position upon releasing the latch means. The front end of the flat bed B is weighted by a weight for returning the flat bed to the horizontal position after the bulk boxes are unloaded.

The bulk boxes, adapted to be carried by the trailer, are generally 48 × 48 inches and 24 inches high and capable of carrying 16 bushels of peaches each. These boxes are generally constructed out of wood and have a pallet type bottom so that the forks of a lift truck can be inserted therein for moving the boxes around when they are not on the trailer. The boxes, generally designated by the reference character 10, have three spaced longitudinal runners carried on the bottom thereof so that the box rolls freely over the rollers C forming part of the flat bed B. The horizontal supporting frame A of the trailer is constructed of a pair of opposed channel members 11 and 12, respectively, which are fixed adjacent one end to an axle 13. The axle is constructed in one particular embodiment, of 2 inches pipe and has wheels 14 suitably mounted for rotation upon the ends thereof. At the front of the trailer the channel members 11 and 12 converge and are joined by a structural plate 15 to which a trailer hitch 16 is attached by any suitable means so that the trailer can be towed by a vehicle.

A laterally extending supporting brace 17 is welded between the side walls of the channels 11 and 12 for strengthening the horizontal frame A, as well as maintaining the distance between the channels 11 and 12 constant so that the flat bed B can be received therebetween. The front end of the flat bed B also rests on the brace 17 when the trailer is in a horizontal position.

A pair of raised braces 18 are carried adjacent the front of the trailer for supporting a water tank (not shown) so that the pickers in the field can get water from the trailer as such passes collecting the peaches from them. The structure for holding the water tank on the braces 18 is not shown.

The flat bed B is constructed of a pair of channel members welded together to form side members 19 and 20, which are joined adjacent the front end by a plate 21. Braces 22 are welded between the side members 19 and 20 for adding support thereto, and maintaining the distance therebetween constant. Conventional rollers C are journalled between the side members 19 and 20 for supporting the boxes 10.

Each side member 19 and 20, respectively, is supported on an elongated brace 22a and attached thereto by any suitable means, such as welding. The elongated braces 22a are, in turn, pivotally mounted on the axle 13. The braces have an opening therethrough which forms a collar through which the axle 13 extends so that the flat bed B can pivot from a horizontal position, such as shown in FIG. 1, to an unloading position such as shown in FIG. 2.

Standing boards 23 and 24 are carried on each side of the trailer so that the picker can stand thereon while dumping his peaches in the bulk boxes. Normally, a tractor is used to pull a trailer through the fields, and as the picker fills a bushel bag he steps onto the standing board 23 and dumps such into the boxes. The tractor operator then punches a card which the picker has indicating the number of bushels of peaches he has picked.

The standing board 23 is mounted on brackets 25 which are, in turn, secured to the channel members 11 and 12, respectively. The standing board 24 is, in turn, secured by brackets 25 to the side members 19 and 20 of the flat bed B.

A vertical retaining member D is carried adjacent the rear of the trailer in the path of the boxes 10 for preventing the boxes 10 from rolling off the rear of the trailer when such is in the horizontal position. This retaining member D includes a rectangular metal plate which is connected by means of a hinge to the rear end of the flat bed B. A rod 27 is used to shift the retaining member D from the vertical position illustrated in FIG. 3 to the horizontal position illustrated in broken lines when the trailer is pivoted to the unloading position. The rod 27 has a bent end portion 28 which extends through an opening in a bracket 29 integral with the plate 26. A cotter pin 30 extends through the bent portion 28 for securing the rod in a pivotal manner to the bracket 29.

Linkage means F is coupled between the flat bed B and the supporting frame A for automatically lowering the retaining means D out of the path of the bulk boxes 10 as the flat bed B pivots to the unloading position. The linkage means includes an upwardly extending slotted arm 30 which has its lower end pivotally secured by a bolt 31 to a bracket 32a welded to the frame A. An obtuse shaped angle member 32 is pivotally connected by a pin 33 extending through an elbow portion to the flat bed B. A cotter pin 34 extends through the pin 33 for maintaining a washer 35 flush against the angle member 32. One end of the angle member has a pin 36 fixed thereto, and extends through the slotted portion 37 of the member 30. A washer 38 is carried on the other end of the pin 36 and secured thereto by a cotter pin 39. The pin 36 is allowed to move within the slotted portion 37. The other end of the angle member 32 has a hole therein for receiving the bent end 40 of the rod 27. The bent end 40 is secured within the angle member 32 by a washer 41 and a cotter pin 42.

As the flat bed B pivots to the unloading position shown in FIG. 2, the linkage mechanism F moves from the full line position illustrated in FIG. 3 to the dotted line position. This, in turn, causes the retaining member D to pivot from the vertical position to the horizontal position out of the path of the boxes 10 allowing the boxes to roll off the rear of the trailer. When the flat bed B pivots the pin 36 rides upwardly within the slotted portion 37 until it engages the end of the slot. This causes the angle member 32 to rotate counterclockwise (FIG. 3), pushing the rod 27 rearwardly.

A latch means, generally designated by the reference character 43, is provided for latching the flat bed B in a horizontal position. The latch means 43 includes a rod 44 which has its ends journalled within brackets 45 carried on the cross-brace 17. A pair of spaced upwardly extending hooks 46 are fixed to the rod 44 and have an inwardly extending portion which projects into an opening in the end plate 21 of the flat bed B. In order to disengage the hooks 46 from the holes the rod 44 is pivoted clockwise by the tractor operator pulling a rope 47. When the rope 47 is pulled, such in turn pulls lever 48 which has its lower end pivotally secured to the frame A.

A connecting rod 49 extends from the lever 48 to an upwardly extending arm 50 fixed to the lateral rod 44. A spring 51 is connected between an upper portion of the lever 48 and the bracket 18 for maintaining the hooks 46 in engagement with the flat bed A. It is noted that the top portion of the hook members 46 are slanted downwardly so that when the flat bed comes down from the unloading position to the horizontal position it will automatically snap in place.

The axle 13 is three-fourths inch forward of the center of the flat bed B so that when the boxes are loaded with peaches and the rope 47 is pulled the trailer will automatically pivot to the unloading position. The tractor operator then drives forward and the boxes gently roll off the trailer onto the ground. This prevents the peaches from being bruised by excessive handling, such as the case when loading and unloading numerous bushel size field boxes. A 25 pound weight 52 is carried adjacent the front of the flat bed B on the end member for causing the flat bed to automatically return to the horizontal position after the boxes have been unloaded. Thus, when the trailer is loaded with the bulk boxes the weight of the trailer is so distributed that the flat bed will tend to pivot to the unloading position, but after the bulk boxes have been unloaded the weight distribution is such to cause the empty flat bed B to return to the horizontal latched position.

It is noted that the bottom end portions 53 of the side members 19 and 20 are inclined to place the boxes closer to the ground during the unloading operation.

What is claimed is:

1. A trailer for transporting bulk boxes loaded with fruit from fields and the like to a remote location comprising: a wheel assembly rotatably carried on an axle, a supporting horizontal frame carried adjacent one end by said wheel assembly, a hitch carried adjacent the other end of said frame for attachment to a vehicle capable of pulling said trailer, an elongated flat bed pivotally carried on said axle independently of said horizontal frame, said elongated flat bed including opposed elongated frame members on each side of the longitudinal centerline of the trailer, a plurality of spaced rollers disposed transversely between said opposed elongated frame members for supporting said bulk boxes, a retaining member carried adjacent a rear end of said flat bed in a vertical position for preventing said bulk boxes from rolling off flat bed when said flat bed is in a horizontal transporting position, latch means engaging said flat bed for maintaining said flat bed in a horizontal position when transporting said bulk boxes, means for releasing said latch means for allowing said flat bed to pivot on said axle to an unloading position where said rear end of said flat bed rests on the ground allowing said bulk boxes to roll off said flat bed, said axle positioned forward of the center of said flat bed so that when said bulk boxes are evenly positioned on said flat bed such pivots to the unloading position upon releasing said latch means, a counterweight on the front end of said flat bed for returning said flat bed to the horizontal position after said bulk boxes are unloaded, and linkage means coupled between said flat bed and said supporting frame for automatically lowering said retaining means out of the path of said bulk boxes as said flat bed pivots to said unloading position.

2. The trailer as set forth in claim 1, wherein said means coupled between said flat bed and said supporting frame includes an angle member pivotally connected at an elbow to said flat bed, one end of said angle member coupled to said supporting frame, another end of said angle member being coupled through a connecting rod to said retaining member so that when said flat bed is pivoted to the unloading position said retaining member is moved out of the path of said boxes allowing said boxes to roll off said flat bed.

* * * * *